(12) United States Patent
Zeutzius et al.

(10) Patent No.: US 8,622,575 B2
(45) Date of Patent: Jan. 7, 2014

(54) LIGHTING APPARATUS

(75) Inventors: Turner Lucas Zeutzius, San Antonio, TX (US); Joey B. Adkins, Hickley, OH (US)

(73) Assignee: Magic Bulb, LLC, San Antonio, TX (US)

( * ) Notice: Subject to any disclaimer, the term of this patent is extended or adjusted under 35 U.S.C. 154(b) by 339 days.

(21) Appl. No.: 12/971,178

(22) Filed: Dec. 17, 2010

(65) Prior Publication Data

US 2012/0153871 A1 Jun. 21, 2012

(51) Int. Cl.
*H05B 37/00* (2006.01)
*F21V 21/00* (2006.01)

(52) U.S. Cl.
USPC . 362/249.02; 362/157; 362/184; 362/311.06; 362/441; 362/448; 315/149; 315/150; 315/246; 315/291; 315/312

(58) Field of Classification Search
USPC ............. 315/185 R, 149, 150, 246, 291, 312; 362/122, 157, 184, 192, 249.02, 362/311.06, 437, 441, 448, 800
See application file for complete search history.

(56) References Cited

U.S. PATENT DOCUMENTS

| 7,086,756 B2 * | 8/2006 | Maxik ...................... 362/249.04 |
| 7,484,860 B2 * | 2/2009 | Demarest et al. ............. 362/253 |
| 7,637,635 B2 * | 12/2009 | Xiao et al. .................... 362/294 |
| 2010/0084997 A1 * | 4/2010 | Oberzeir et al. .............. 315/313 |

* cited by examiner

*Primary Examiner* — Douglas W Owens
*Assistant Examiner* — Thai Pham

(57) ABSTRACT

A lighting assembly having a socket adaptor and a microprocessor for receiving user input and selectively actuating at least one LED based on that user input. The microprocessor is electrically connected to the socket adaptor. A processor-readable medium is in electrical communication with the microprocessor. An LED assembly comprising at least one plurality of LEDs is electrically connected to the microprocessor. A lens encloses the LED assembly and the microprocessor. An input device is electrically connected to the microprocessor to receive user input.

15 Claims, 14 Drawing Sheets

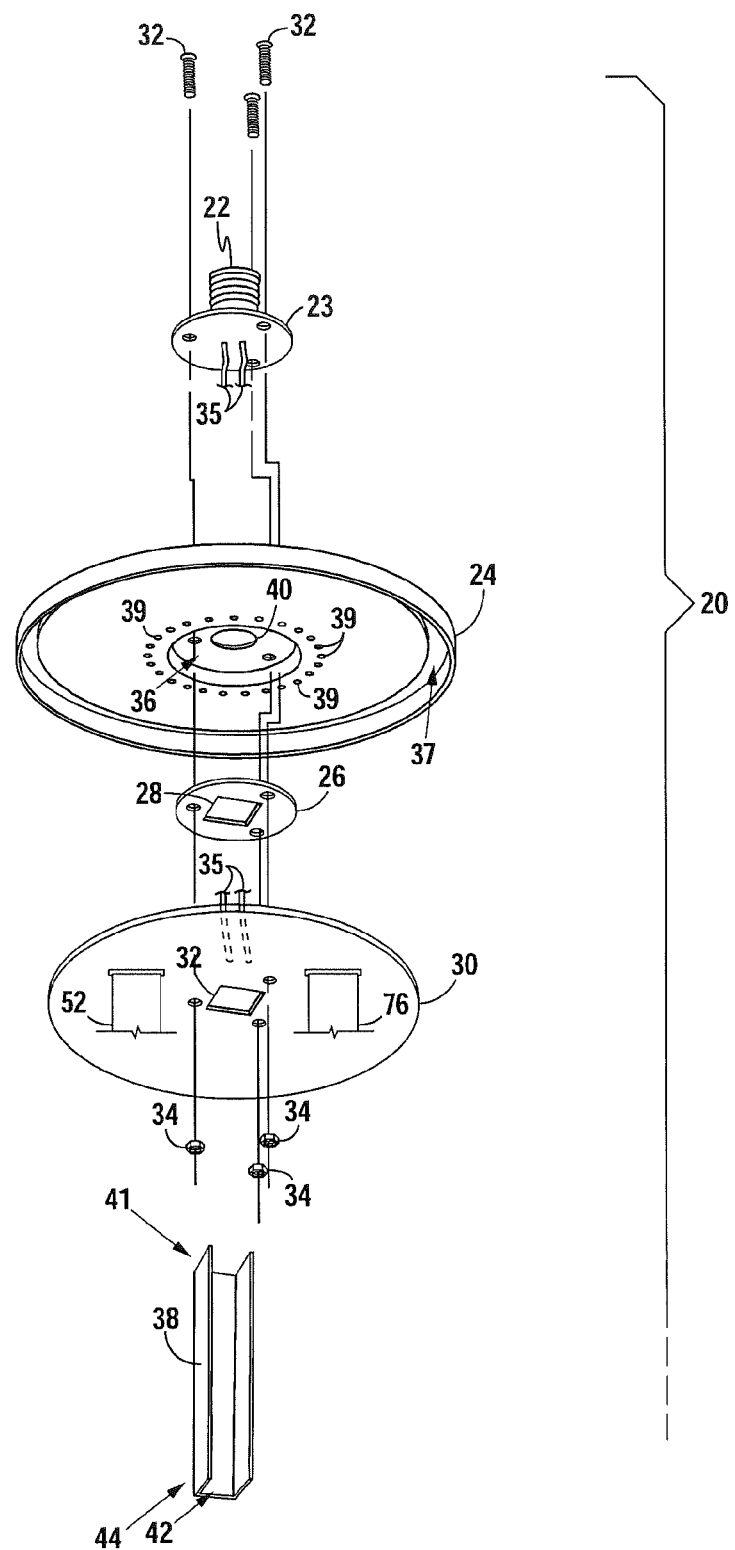

LIGHTING APPARATUS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Invention

The present invention relates to lighting. More specifically, the present invention is an LED lighting apparatus with multiple modes of operation.

BRIEF SUMMARY OF THE INVENTION

One embodiment of the present invention comprises a socket adaptor and a microprocessor for receiving user input and selectively actuating at least one LED based on that user input. The microprocessor is electrically connected to the socket adaptor. A processor-readable medium is in electrical communication with the microprocessor. An LED assembly comprising at least one LED is electrically connected to the microprocessor. A lens encloses the LED assembly and the microprocessor. A user input device is electrically connected to the microprocessor to receive user input.

Further aspects of the invention comprise computer-executable instructions for performing the following steps: (i) selecting a current operating mode from a plurality of possible operating modes based on user input received from the user input device, wherein each of the possible operating modes includes at least one operating mode parameter; (ii) changing an operating parameter for the current operating mode based on user input received from the user input device; and (iii) providing output from the microprocessor to the LED assembly, wherein the output is a function of the current operating mode and the current operating mode parameters. The preferred embodiment includes five operating modes: (i) a first operating mode having a having a first parameter, wherein in the first mode the microprocessor strobes at least one of the first, second, and third pluralities of LEDs at a frequency that is a function of the first parameter; (ii) a second operating mode having a second parameter, wherein in the second mode the microprocessor powers the LED assembly to display apparent rotation with an apparent rotation frequency that is a function of the second parameter; (iii) a third operating mode having a third parameter, wherein in the third mode the microprocessor powers exactly one of the at least one plurality of LEDs based on the third parameter; (iv) a fourth operating mode comprising a multiple-color cycle frequency parameter, wherein in the fourth mode the microprocessor cycles between at least two of the at least one plurality of LEDs with a frequency that is a function of the fourth parameter; and (v) a fifth operating mode having a fifth parameter, wherein in the fifth operating mode the microprocessor selectively actuates the at least one plurality of LEDs based on the level and frequency of ambient sound.

BRIEF DESCRIPTION OF THE SEVERAL VIEWS OF THE DRAWINGS

FIGS. 1A-1C together comprise an exploded assembly view of the preferred embodiment of the invention.

DETAILED DESCRIPTION OF THE INVENTION

Figure 1B:
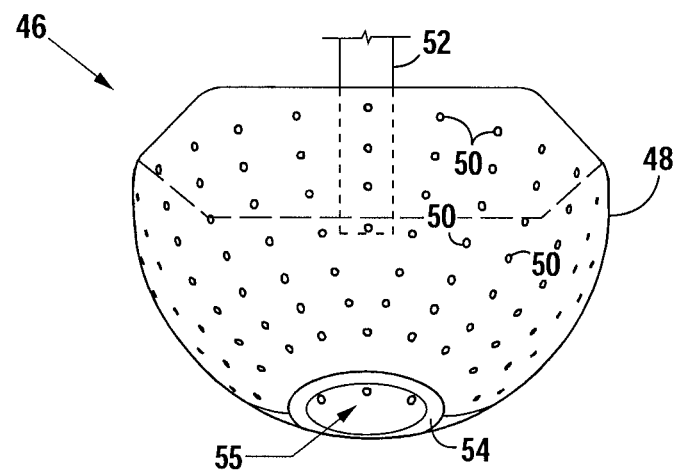
Figure 1B:
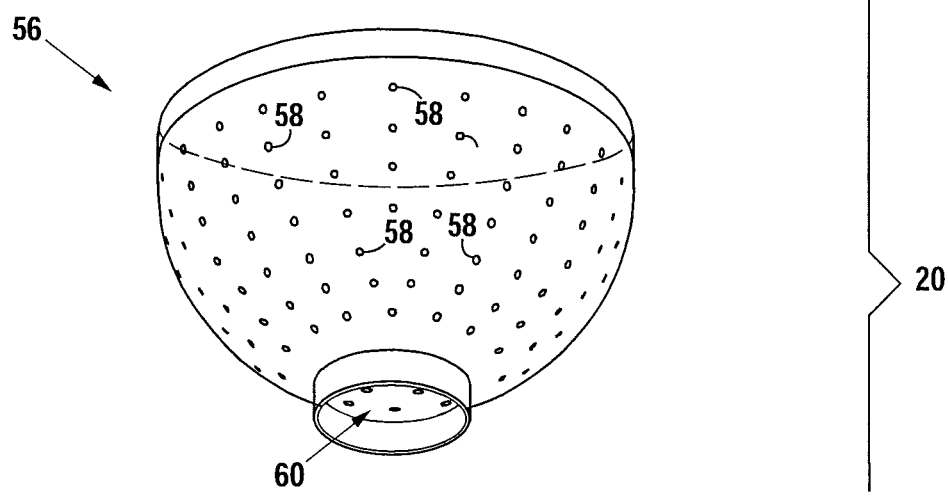
Figure 1C:
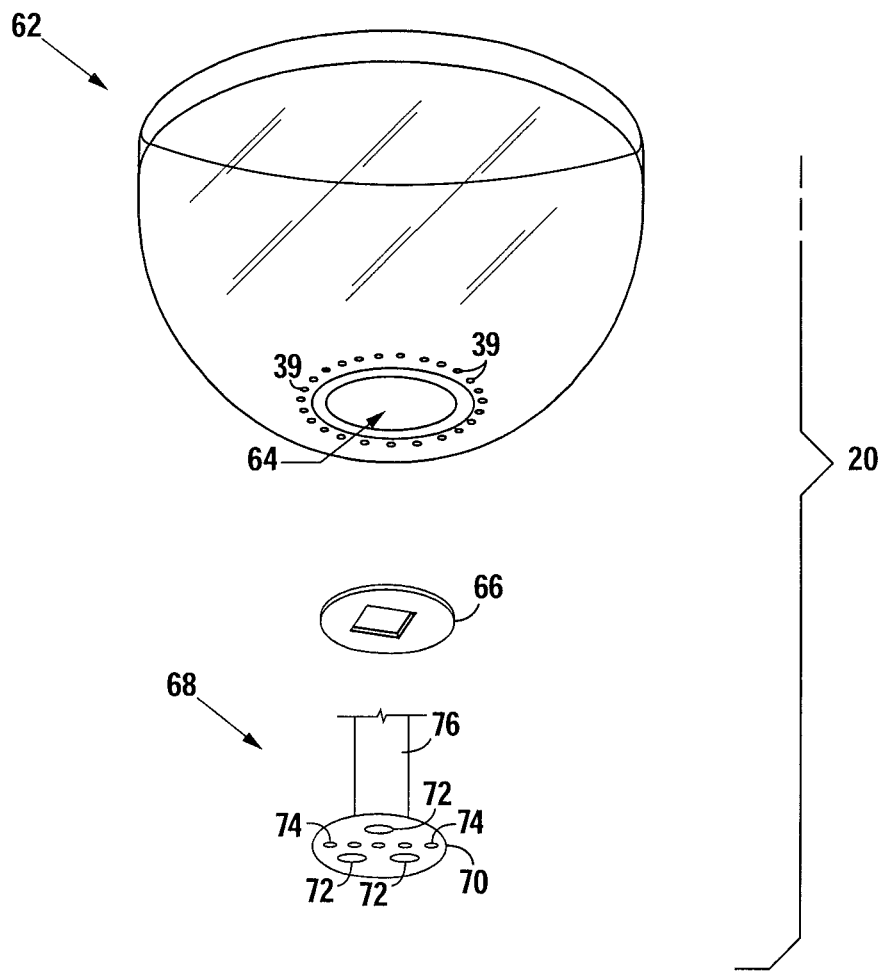

FIGS. 1A-1C together show an exploded view of the preferred embodiment 20 of the invention. As shown in FIG. 1A, a socket adaptor 22 having a flange 23 is fastened to a cap 24, an upper catch plate 26 having a square channel 28 formed through its center, and a circular circuit board 30 having a square channel 32 formed through its center, using bolts 32 and nuts 34. The cap 24 has a raised center portion 36 and an outer rim 37. Vent holes 39 provide an air circulation path into the embodiment for cooling and to more easily allow sound to enter the embodiment 20. A circular channel 40 is formed through the raised center portion 36 for attachment to the socket adaptor 22. The upper catch plate 26 is positioned within the raised center portion 36. Power wires 35 are connected between socket adaptor 22 and the circuit board 30. The upper catch plate 26 is positioned around and adhered to a connecting member 38 at its upper end 41. The connecting member 38 is an elongate member having three sides to form an open channel 42 between the upper end 41 and a lower end 44. The connecting member 38 provides structural rigidity to the embodiment 20.

As shown in FIG. 1B, an LED assembly 46 is formed of a flexible second circuit board 48 and a plurality of LEDs 50 positioned therein. The plurality of LEDs 50 includes first, second, third, and fourth pluralities of LEDs that are red, blue, green, and white respectively. A ribbon cable 52 electrically connects each of the LEDs 50 to the circuit board 30 to provide power. The ribbon cable 52 is positioned in the channel 42 of the connecting member 38 and is electrically connected to the circuit board 30. The LED assembly 46 comprises a center ring member 54 that defines a passage 55 through the bottom of the LED assembly 46.

The LED assembly 46 is positioned within an opaque inner bowl 56 having a plurality of channels 58 disposed therethrough that are alignable with the LEDs 50 of the LED assembly 46. A channel 60 provides access through the bottom of the inner bowl 56. When placed inside the inner bowl 56, flexible circuit board 48 folds upward to conform to the contour of the interior surface of the inner bowl 56, with each of the LEDs 50 resting in a channel 58 of the inner bowl 56.

As shown in FIG. 1C, the inner bowl 56 is positioned within a transparent lens 62 that has a circular channel 64 formed therethrough. The lower channel 60 of the inner bowl 56 is aligned with the circular channel 64 of the lens 62. Both the inner bowl 56 and the lens 62 are positioned around the connecting member 38.

A lower catch plate 66 is positioned around and adhered to the lower end 44 of the connecting member 38. The lower catch plate 66 supports and holds the lens 62 in place.

A local input device 68 is adhered to the bottom surface of the lower catch plate 66, and comprises a thin printed MYLAR film 70 with three buttons 72 for tactile user input. LED indicators 74 provide indication of the current operating state of the embodiment. A ribbon cable 76 electrically connects the local input device 68 with the circuit board 30. The ribbon cable 76 is positioned within the channel 42 of the connecting member 38.

Figure 2:
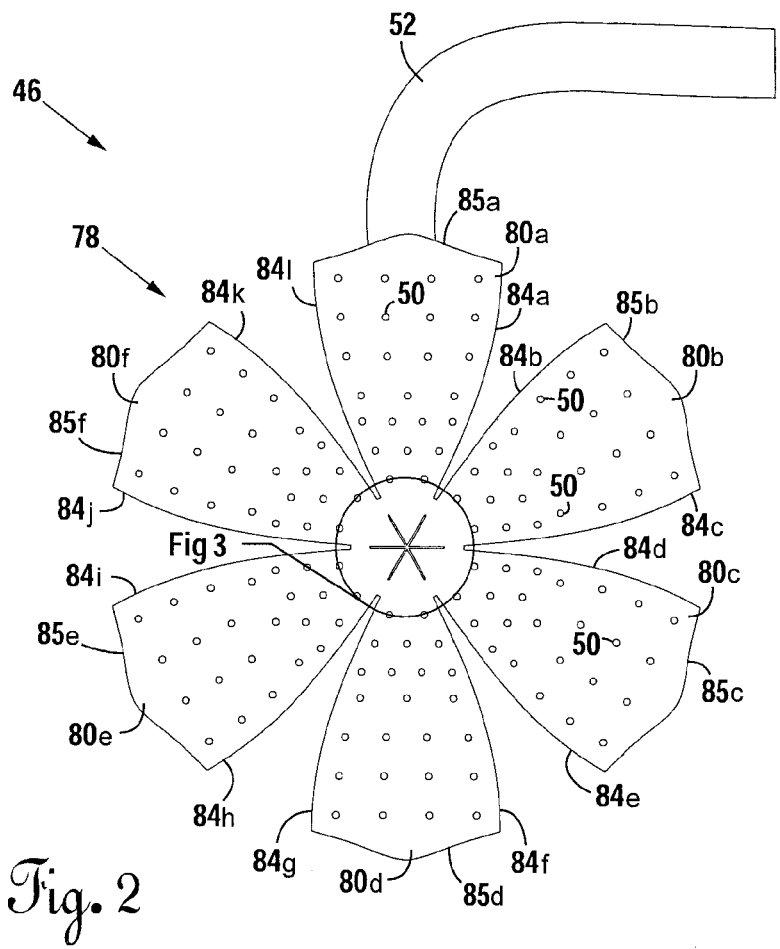
FIG. 2 is a top elevation of the LED assembly of the preferred embodiment.
Figure 3:
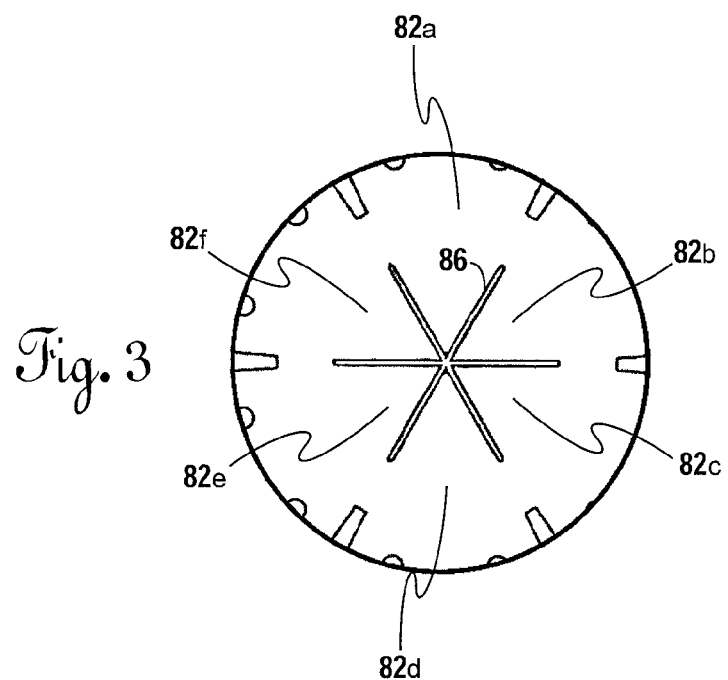
FIG. 3 is an enlarged view of a section of FIG. 2.

FIGS. 2 and 3 depict the LED assembly 46 of the preferred embodiment in greater detail. The LED assembly 46 comprises a thin, flexible second circuit board 78 formed of a six petal-shaped panels 80a-80f having inside ends 82a-82f and sides 84a-84l. A star-shaped opening 86 formed in the circuit board 78 separates the inside ends 82a-82f of the panels 80a-80f. The LEDs 50 are fixed to the panels 82a-82f and are in communication with the flexible circuit board 78 through the ribbon cable 52.

When the LED assembly 46 is placed in the inner bowl 56, the panels 80a-80f fold upward to form to the contour of the inner surface of the inner bowl 56. The sides 84a-84l of the panels 80a-80f become contiguous to form a bowl-like shape. More specifically, the first side 84a meets the second side 84b, the third side 84c meets the fourth side 84d, and so on. The outer edges 85a-85f become contiguous. As the panels 80a-80f fold upward, the inner ends 82a-82f fold downward to open the star shaped opening 86 to form the channel 55 and center ring member 54 (see FIG. 1B).

Figure 4:
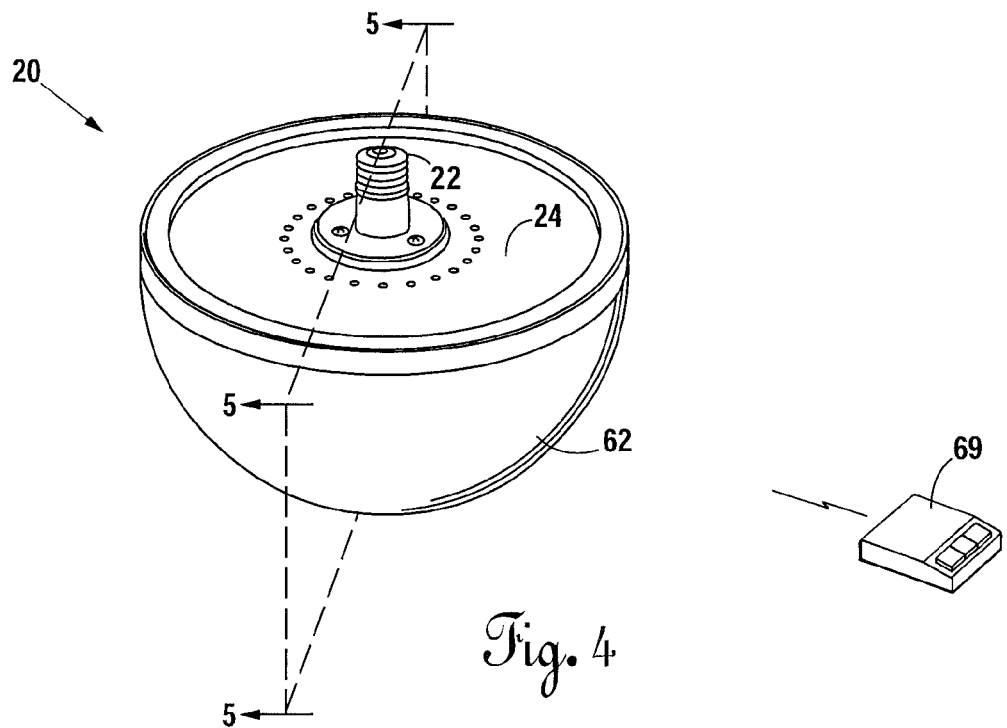
FIG. 4 is an isometric view of the preferred embodiment.

FIG. 4 depicts an isometric view of the preferred embodiment. In addition to the local input device 68, a remote input device is provided in the form of a three-channel transmitter 69.

Figure 5:
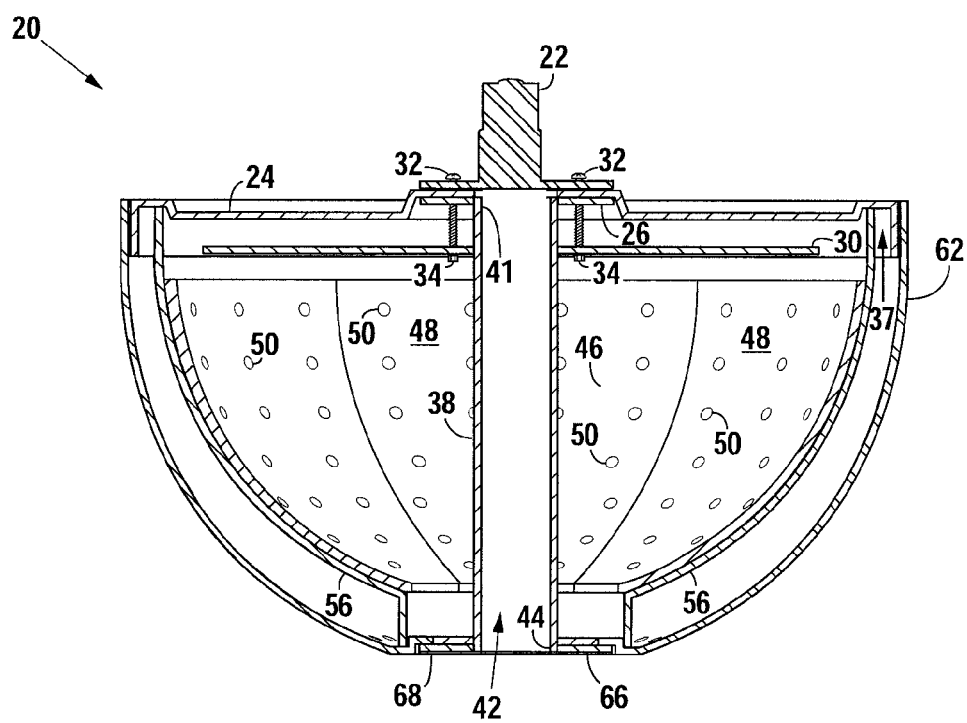
FIG. 5 is a sectional elevation through plane 5 of FIG. 4.

FIG. 5 is a partial sectional view through a plane 5 of FIG. 4. One way of assembling the preferred embodiment 20 is as follows. The upper catch plate 26 is adhered to the upper end 41 of the connecting member 38. The flange 23 of the socket adaptor 22 is then bolted to the cap 24, the upper catch plate 26, and the circuit board 30 using bolts 32 and nuts 34. The LED assembly 46 is placed in the inner bowl 56 and then the ribbon cable (not shown) attached to the circuit board 30. The lens 62 is positioned around the inner bowl 56 and connecting member 38 and the lower catch plate 66 adhered to the lower end 44 of the connecting member 38. Finally, the local input device 68 is adhered to the lower catch plate 66.

Figure 6:
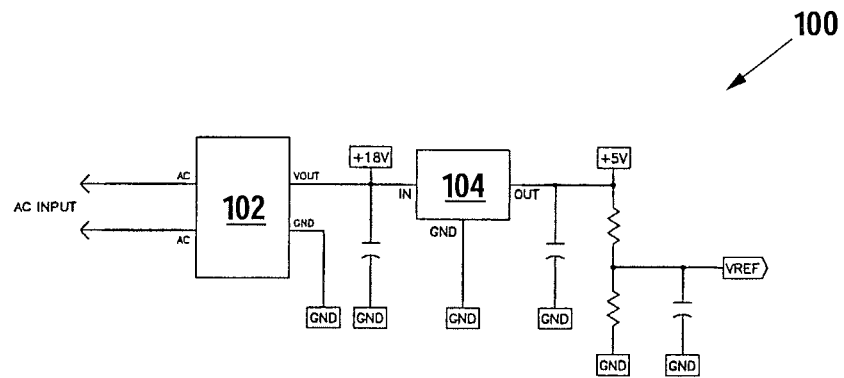
FIG. 6 shows the power supply circuit of the preferred embodiment.

FIGS. 6-12 collectively disclose circuit schematic of the preferred embodiment disclosed in FIGS. 1-5. FIG. 6 shows the power supply circuit 100 of the preferred embodiment. A switched mode power supply 102 accepts ninety to two-hundred forty volts (AC) from the socket adaptor 22 and provides eighteen volts (DC) at one ampere of output to a three-terminal positive voltage regulator 104.

Figure 7:
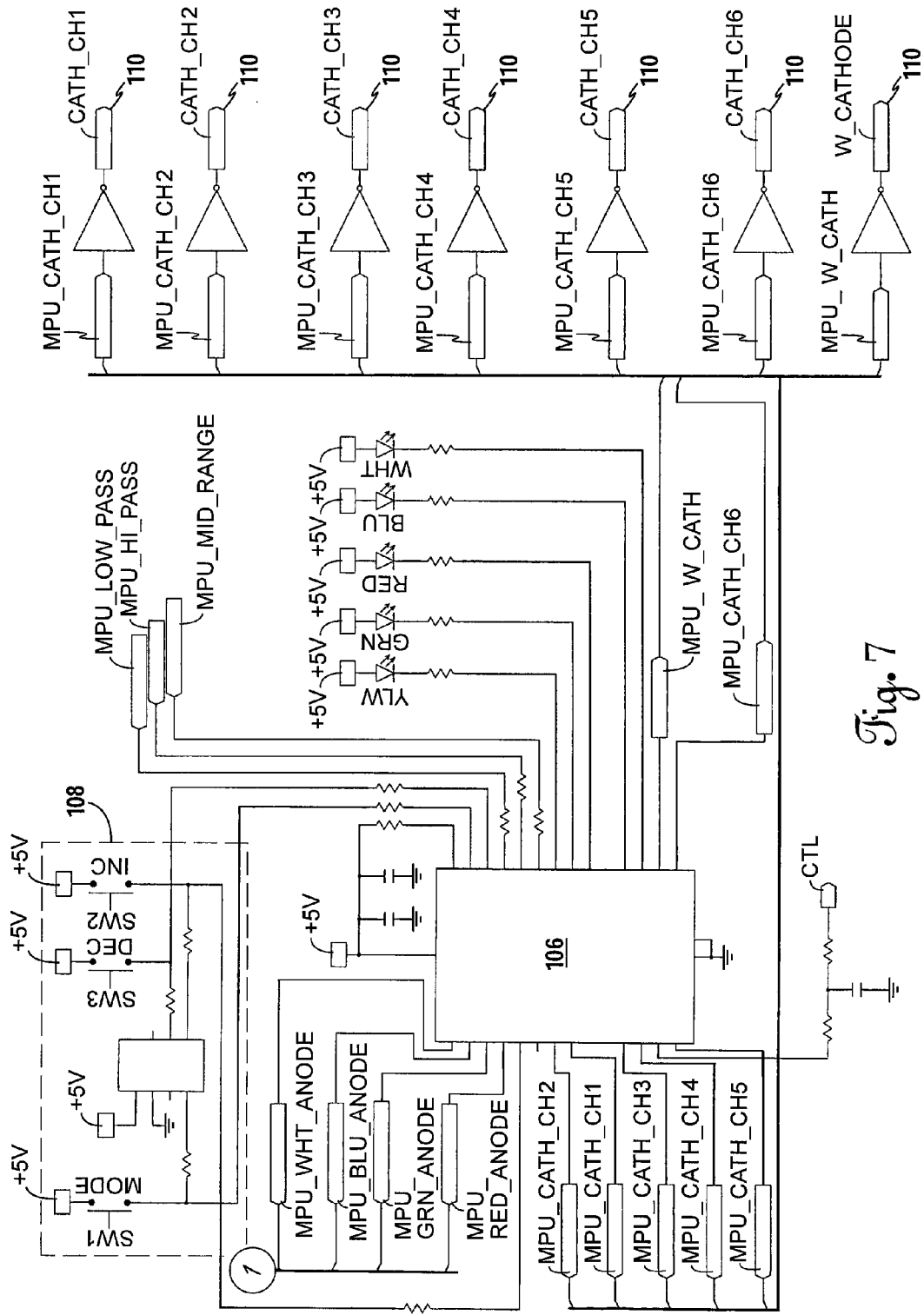
FIG. 7 shows the microprocessor and local input circuit of the preferred embodiment.

Referring to FIG. 7, a microprocessor 106, which is a PIC18F2221 with an integrated processor-readable medium, receives power from the power supply circuit 100. A local input circuit 108 detects actuation of the local input device 68 and provides resulting signals to the microprocessor 106 representative of user input. The microprocessor 106 drives one or more cathodes 110 based on user input.

Figure 7A:
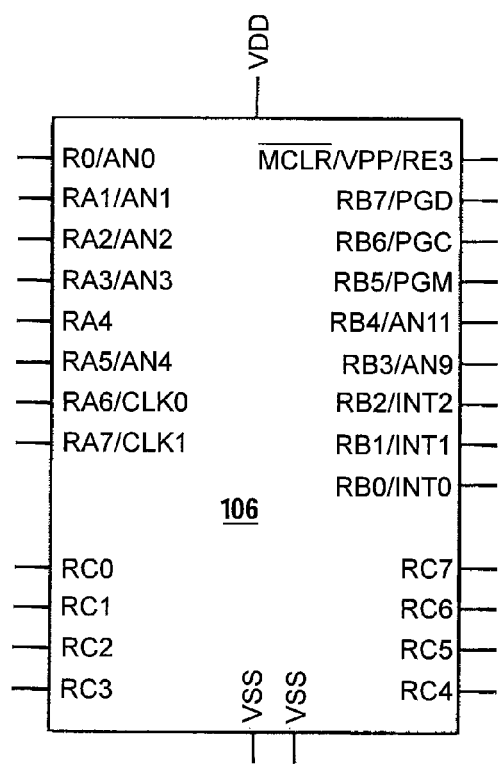
FIG. 7A is an enlarged view of the microprocessor shown in FIG. 7.

FIG. 7A is an enlarged view of the microprocessor 106 shown in FIG. 7.

Figure 8:
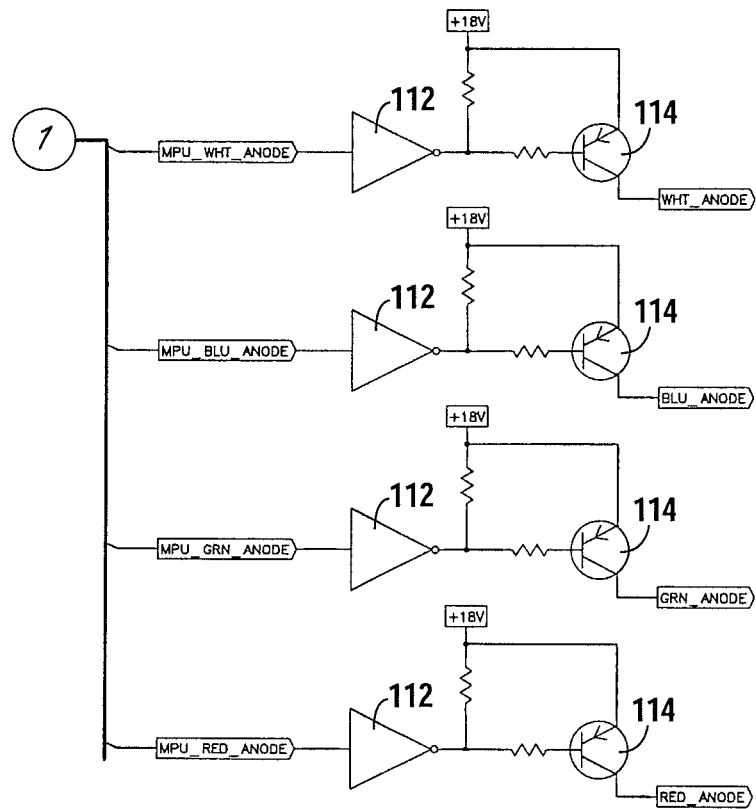
FIG. 8 shows the connection of the microprocessor to the anodes.

FIG. 8 shows the connection between the microprocessor 106 and the anodes of the pluralities of white, blue, and green, and red LEDs 50. The microprocessor 106 is connected to inputs of Darlington transistors 112. Outputs of the Darlington transistors 112 are connected to the base of transistors 114. Emitters of the transistors 114 are connected to the white, blue, green and red anodes of the LEDs 50.

Figure 9:
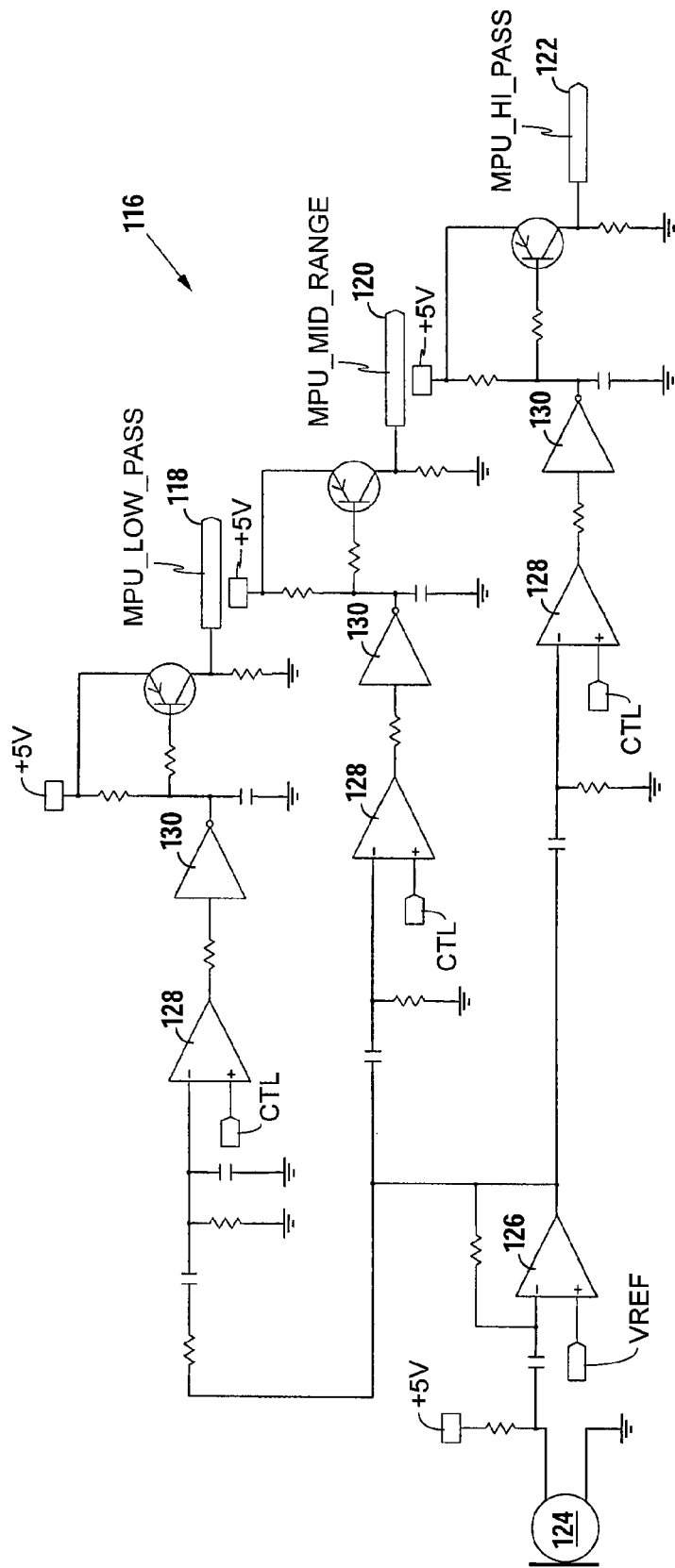
FIG. 9 shows an audio input circuit of the preferred embodiment.

Referring to FIG. 9, the circuitry includes an audio circuit 116 with a low pass output 118, a mid range output 120 and a hi-pass output 122, each of which are provided to inputs of the microprocessor 106 (see FIG. 7). The audio input signal from a microphone 124 is coupled to an op amp 126 for amplification of the audio signal. The amplified signal is provided to low power dual op amps 128 and high-voltage, high current Darlington transistors 130. In this embodiment, the low-pass output 118 actuates at frequencies below 1.5 kHz, the mid-range output 120 actuates at input frequencies of between approximately 1.5 kHz and 3.5 kHz, and the hi-pass output 122 actuates at frequencies above 3.5 kHz.

Figure 10:
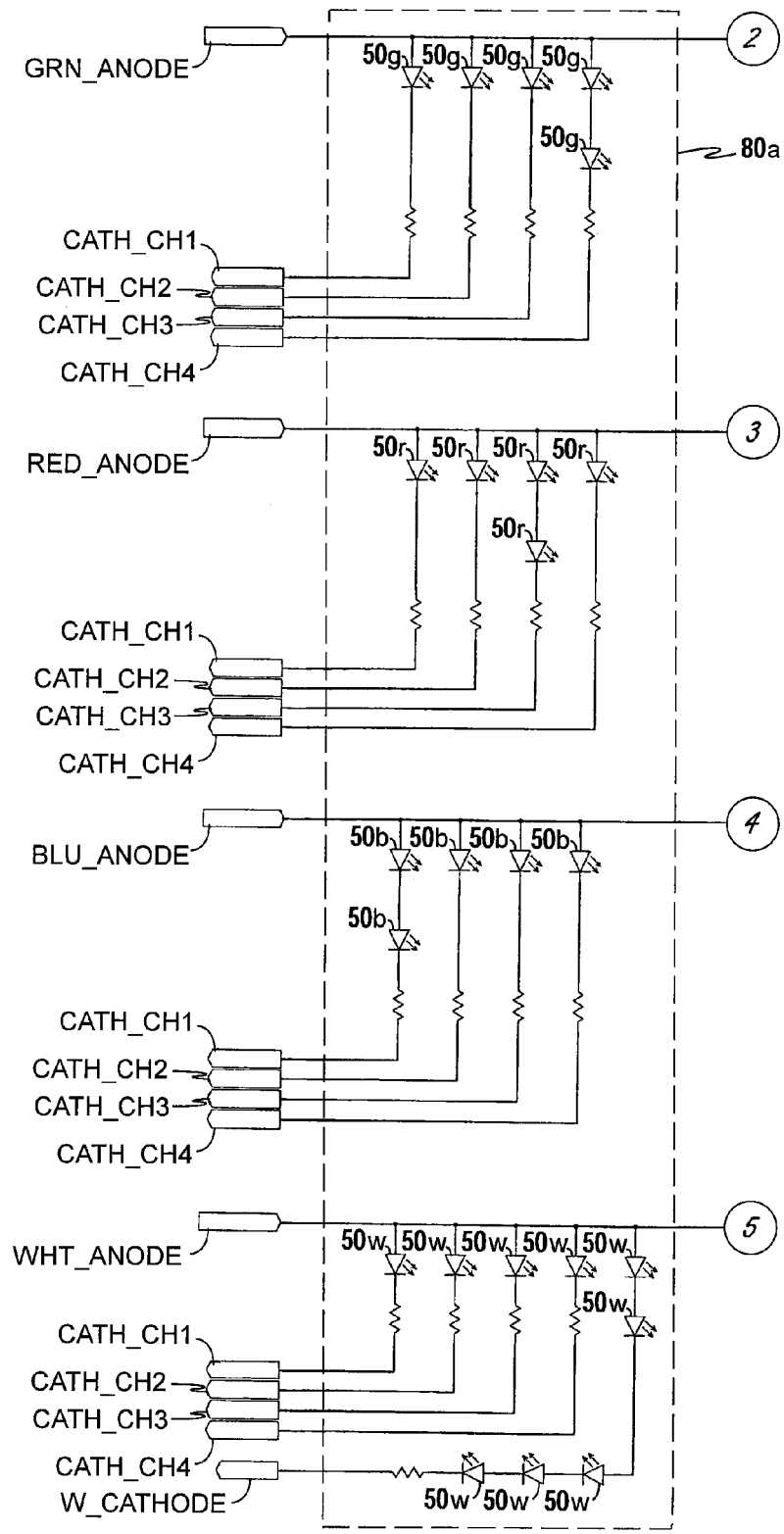
FIG. 10 shows the circuit of the first panel of the LED assembly of the preferred embodiment.

Referring to FIG. 10, circuitry of the first panel 80a of the LED assembly 46 is shown, which has a plurality of red LEDs 50r, green LEDs 50g, blue LEDs 50b, and white LEDs 50w. The fourth panel 80d of the LED assembly 46 is identically configured.

Figure 11:
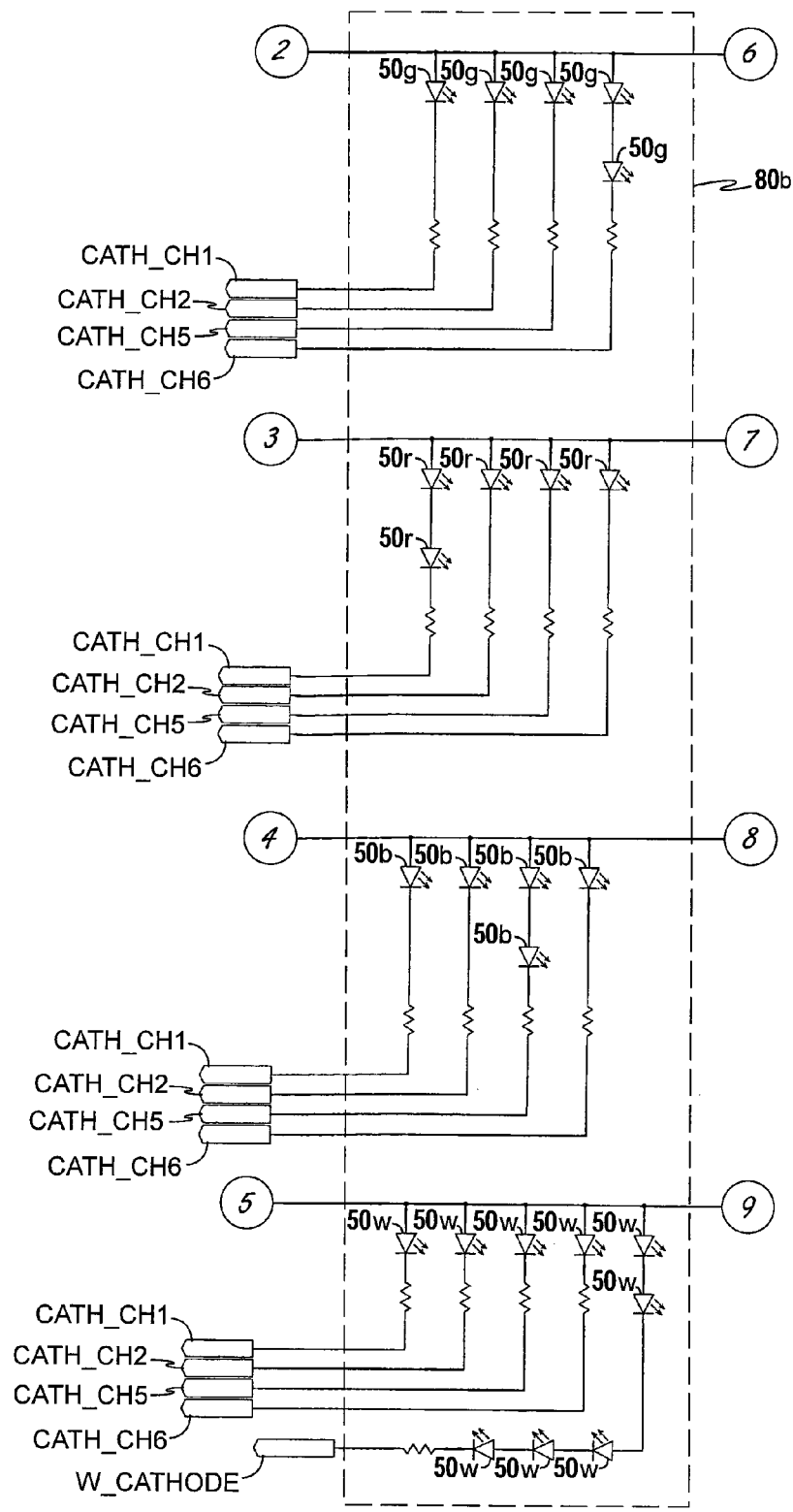
FIG. 11 shows the circuit of the second panel of the LED assembly of the preferred embodiment.

Referring to FIG. 11, circuitry of the second panel 80b of the LED assembly 46 is shown, which has a plurality of red LEDs 50r, green LEDs 50g, blue LEDs 50b, and white LEDs 50w. The fifth panel 80e of the LED assembly 46 is identically configured.

Figure 12:
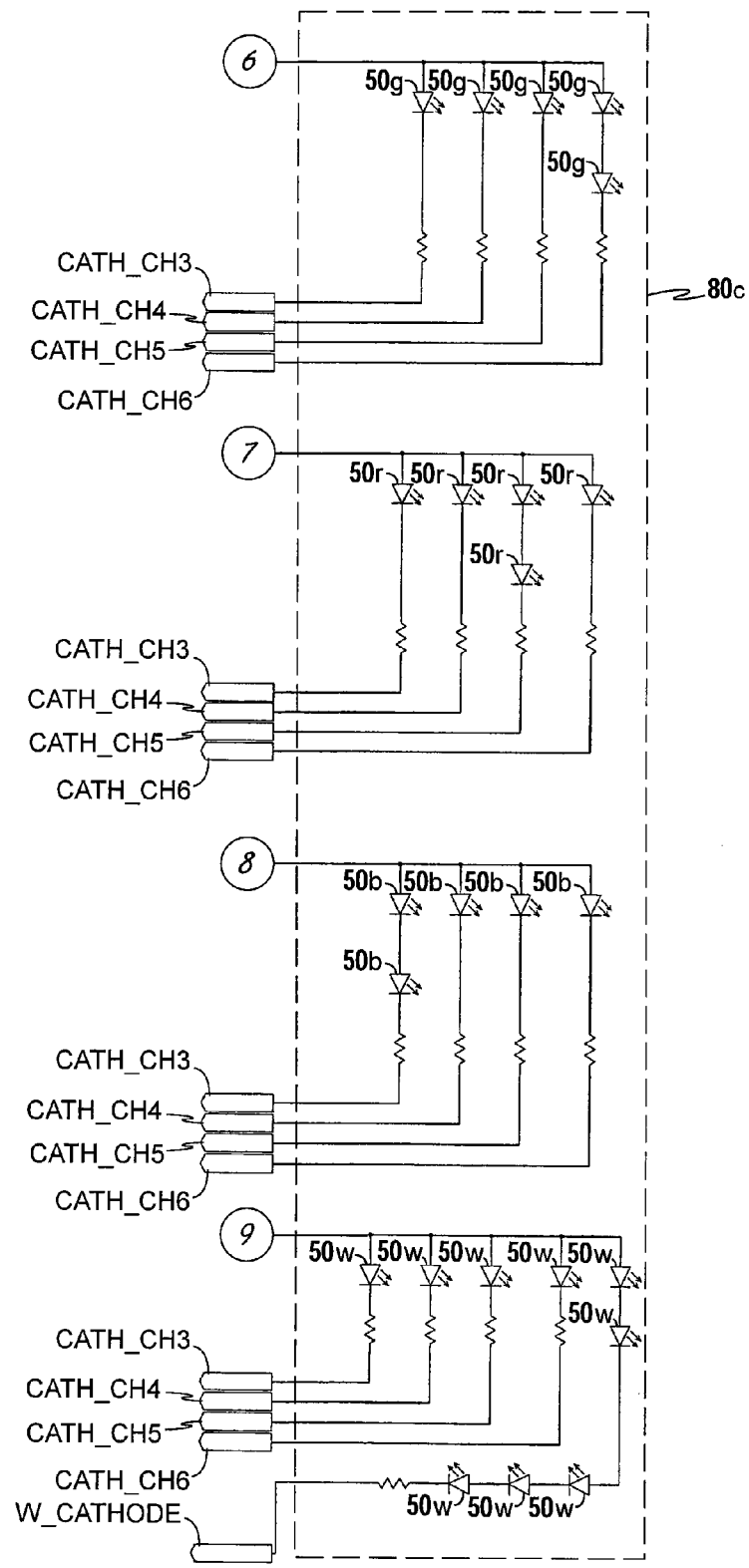
FIG. 12 shows the circuit of the third panel of the LED assembly of the preferred embodiment.

Referring to FIG. 12, circuitry of the third panel 80c of the LED assembly 46 is shown, which has a plurality of red LEDs 50r, green LEDs 50g, blue LEDs 50b, and white LEDs 50w. The sixth panel 80f of the LED assembly 46 is identically configured.

To use the assembly, the flanged socket adaptor 22 is threaded into a standard one-hundred twenty volt lighting socket. When the light socket is powered, power is provided through the socket adaptor 22 to the circuit board 30. Thereafter, behavior of the embodiment 20 is determined from the operating program in combination with user input.

The preferred embodiment can be changed between five modes of operation: STROBE, DISCO, PARTY BULB, MOOD LAMP, and COLOR ORGAN. The apparatus powers up in STROBE mode in the STEADY ON flash rate. The INC and DEC buttons of the user input device cause the microprocessor to change the flash rate between STEADY ON and ten cycles per second (cps).

When the MODE button is pressed and assembly is in STROBE mode, the microprocessor changes to DISCO mode. The microprocessor causes the LEDs to actuate in a pattern that gives the appearance the apparatus is rotating. INC and DEC inputs cause the microprocessor to change the rate of apparent rotation between one cps and one rotation every ten seconds.

When the MODE button is pressed and assembly is in DISCO mode, the microprocessor changes to PARTY BULB mode in which only the red LEDs are powered. An INC input in this state causes only the blue LEDs to be powered, while a DEC input in this state causes only the green LEDs to be powered. When only the blue LEDs are powered, an INC input causes the green LEDs to be powered, and a DEC input causes only the red LEDs to be powered. When only the green LEDs are powered, an INC input causes only the red LEDs to be powered and a DEC input causes only the blue LEDs to be powered.

When the MODE button is pressed with the assembly in PARTY BULB mode, the microprocessor changes to MOOD LAMP mode with the red LEDs fully powered with a cycle rate of sixty-six thousandths of a cps. The red LEDs fade while the blue LEDs simultaneously are brought to full power, such that when the blue LEDs are fully powered, the red LEDs are fully unpowered. The blue LEDs then begin to fade while the green LEDs are brought to fully power after which the greed LEDs begin to fade while the red LEDs again are brought to full power. The INC and DEC inputs increase or decrease, respectively, the rate of the full three-color cycle between approximately one-third cps (i.e., one of each color every three seconds) and sixty-six thousands of a CPS (i.e., one of each color every fifteen seconds).

When the MODE button is pressed with the assembly in MOOD LAMP mode, the microprocessor changes the operating mode to COLOR ORGAN mode, wherein the level and frequency of the ambient sound selectively power of red, blue, or green LEDs.

When the MODE button is pressed with the assembly in MOOD LAMP mode, the microprocessor changes back to STROBE mode.

When the MODE button is held for at least three seconds, the microprocessor causes the apparatus to go into a standby mode in which the LED assembly is not powered. The apparatus may be revived by pressing the MODE button.

Figure 13:
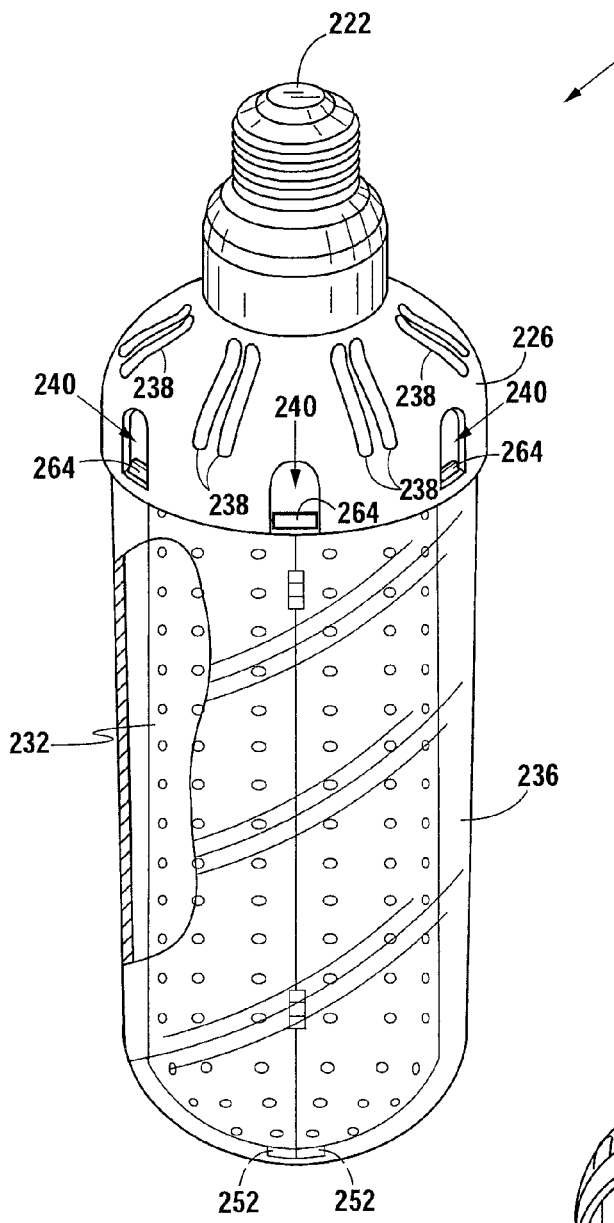
FIG. 13 is an top isometric drawing of a second embodiment of the present invention.
Figure 14:
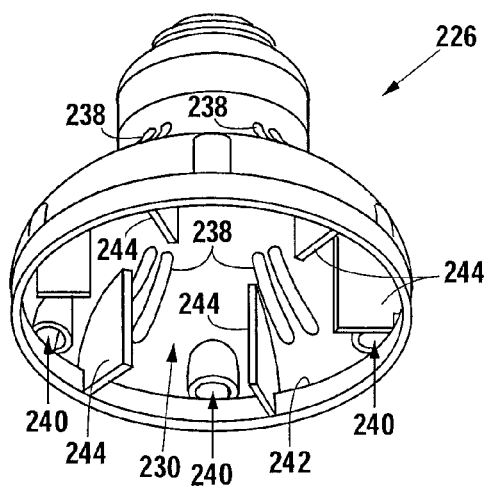
FIG. 14 is a bottom isometric view of the cap of the second embodiment.
Figure 15:
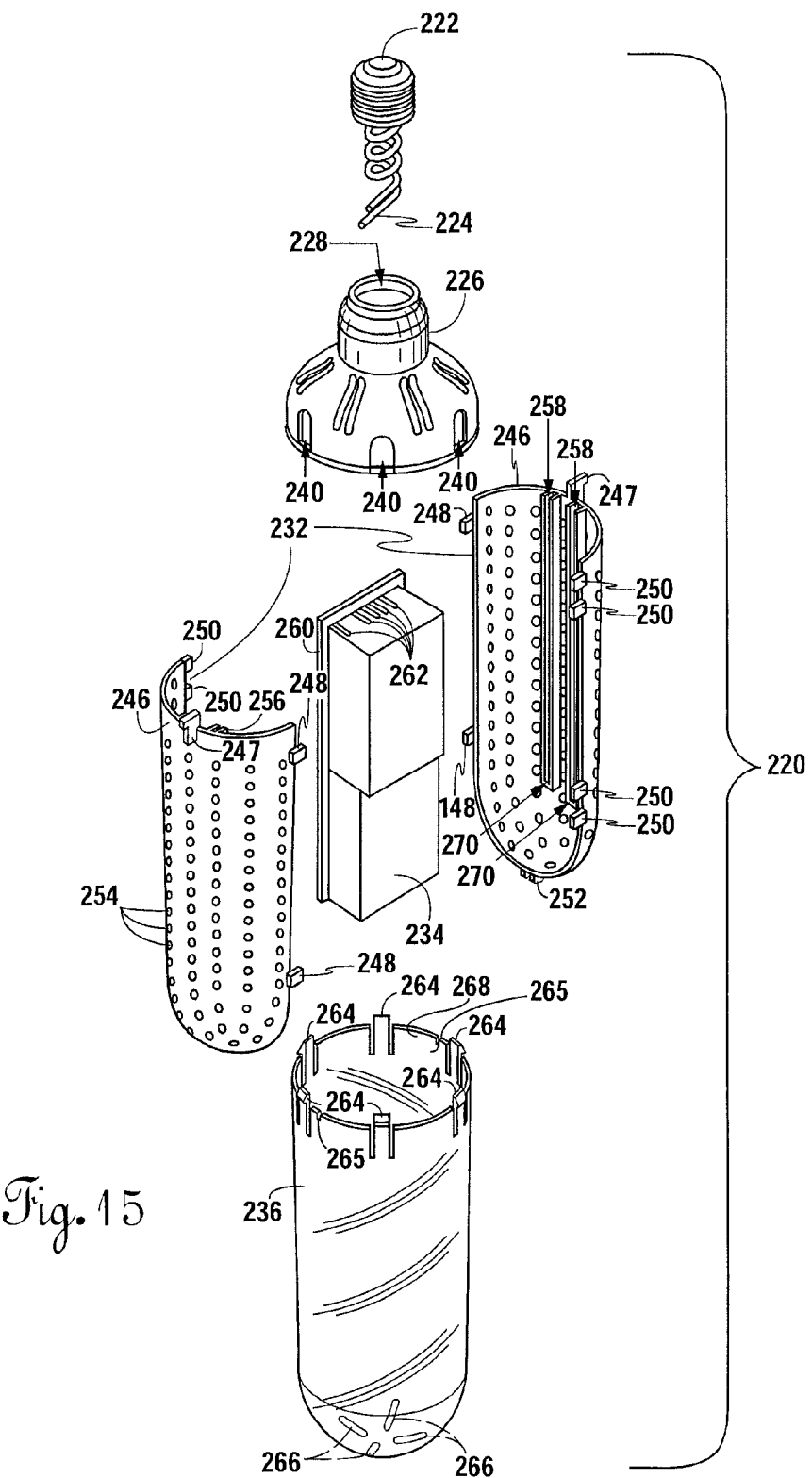
FIG. 15 is an exploded isometric view of the second embodiment shown in FIG. 13.

FIG. 13-15 collectively disclose an alternative embodiment 220 of the present invention, which comprises a threaded socket adaptor 222 having a pair of power leads 224, a cap 226 having a threaded top opening 228 and a bottom opening 230, an LED assembly comprising a support assembly 232 and at least one plurality of LEDs, an electronics housing 234, and a lens 236. The socket adaptor 222 is threaded into the top opening 228 of the cap 224.

The cap 224 has a series of elongated vents 238 disposed therethrough for heat dissipation. Six openings 240 are equidistantly spaced around the cap 224 proximal to the bottom opening 230 to receive and lock with upwardly-orientated snap latches. As shown in FIG. 14, an annular shoulder 242 is located proximal to the lower opening of the cap 224. A plurality of ribs 244 are equally spaced around the interior of the cap 224 and extend radially inward toward the center of the cap 224.

Referring to FIG. 15, the support assembly 232 is generally tubular, and comprises two engaged, identically-shaped support members 246. Each support member 246 is generally half-tubular with an open top end and a closed bottom end that is generally hemispherical. Each of the support members 246 comprises first interlocking members 248 engagable with second interlocking members 250 of the other support member 246.

An integrally-formed top spacing member 247 is positioned at the top of each support member 146 and extends radially outwardly therefrom. Spacing members 252 are positioned at the closed bottom end of the support members 246. In addition, the support members 246 comprise a plurality of LED channels 254 for receiving LEDs.

Each support member 246 comprises longitudinal ribs 256 on its interior surface that form two vertical slots 258. When the support members 246 are engaged, the vertical slots 258 of each support member 246 are aligned with the vertical slots 258 of the other support member. The bottom end 270 of each slot 258 is closed.

The circuitry of the second embodiment 220, which is as described with reference to the preferred embodiment, is housed in the generally-rectangular housing 234. One surface of the housing 234 forms a rectangular rim 260 having the same thickness as the verticals slots 258. The housing 234 provides connections 262 to receive power from the socket adaptor 222 and to provide electrical connection to the LEDs.

Still referring to FIG. 15, the lens 236 is generally tubular with an open top end and a closed bottom end that is hemispherically shaped. The lens 236 is slightly tapered from the top end to the bottom end, and generally is similar in shape to the support assembly 232. The lens 236 comprises six equally spaced, upwardly orientated snap latches 264 at its upper end corresponding in spacing to the spacing of the openings 240 in the cap 224. Two alignment slots 265 are positioned in the upper end to receive the top spacing members 247 of the support members 246. Four elongated vent holes 266 are formed in the bottom end for heat dissipation. The lens 236 is clear and polished, and may have a frosted inner surface 268.

The alternative embodiment may be assembled as follows. First, the power leads 124 are positioned through the upper opening 238 of the cap 226, and the socket adaptor 222 is threaded to the cap 226. Second, the channels 254 of the LED support members 246 are populated with the LEDs. Thereafter, the first and second LED supports 246 are engaged so that the first interlocking members 248 interlock with the second interlocking members 250. The support assembly 232 is then positioned in the lens 236, where the interlocking members 248, 258 and spacing members 252 cause the support assembly 232 to be. The top spacing members 247 are aligned with alignment slots 265 to prevent rotation of the support assembly 232 relative to the lens 236. The rim 260 of the electronics housing 234 is thereafter positioned in one aligned pair of vertical slots 258, and the housing 234 lowered into the support assembly 232 until it contacts and is supported by the closed bottom end 270. LED wiring and the adaptor leads 224 are thereafter connected to the connection points 262 of the housing 234. The cap 226 is thereafter engaged with the lens 236 by aligning the snap latches 234 with the openings 248 and urging the lens into the cap 226, thus causing the snap latches 234 to engage with the bottom edge of the openings 240. In this position, the ribs 244 extend partially over the electronics housing to retain the housing in the slots 258.

The circuitry within the housing, as well as operation of the embodiment 220, is as described with reference to the first-described embodiment with reference to FIGS. 6-12. However, input is exclusively through a remote input device (not shown).

The present invention is described above in terms of preferred illustrative embodiments of specifically-described lighting apparatus. Those skilled in the art will recognize that alternative constructions can be used in carrying out the present invention. Other aspects, features, and advantages of the present invention may be obtained from a study of this disclosure and the drawings, along with the appended claims.

We claim:

1. A lighting assembly comprising:
    a socket adaptor matable with a light socket that provides a first voltage;
    a microprocessor powered by a second voltage;
    a power supply circuit that converts said first voltage to said second voltage, said power supply circuit being connected electrically between the socket adaptor and said microprocessor;
    a microprocessor-readable medium in electrical communication with said microprocessor;
    a cap coupled to said socket adaptor;

a support assembly having an interior surface, an open end attached to said cap, and a closed end opposing said open end, said support assembly having a plurality of LED channels for receiving LEDs;

at least one plurality of LEDs disposed in said plurality of LED channels;

a generally tubular lens enclosing said support assembly; and a tactile input device electrically connected to said microprocessor.

2. The lighting assembly of claim 1 wherein said at least one LED comprises a first plurality of LEDs having a first color, a second plurality of LEDs having a second color, a third plurality of LEDs having a third color, and a fourth plurality of LEDs having a fourth color.

3. The lighting assembly of claim 1 further comprising an audio input device electrically connected to said microprocessor.

4. The lighting assembly claim 1 wherein said support assembly comprises at least two generally half-tubular support members, each support member having an open end and a closed end opposing said open end.

5. The lighting assembly of claim 1 further comprising at least one longitudinal rib extending from the interior surface of the support assembly to define at least one slot having a closed end, wherein at least a portion of said electronics housing occupies said at least one slot.

6. The lighting assembly of claim 1 wherein said microprocessor-readable medium includes computer-executable instructions for performing a method comprising:

selecting a current operating mode from a plurality of possible operating modes based on user input received from said tactile input device, wherein each of said possible operating modes includes at least one operating mode parameter;

changing an operating parameter for the current operating mode based on user input received from said tactile input device; and providing output from said microprocessor to said LED assembly, wherein said output is a function of said current operating mode and said current operating mode parameters.

7. The lighting assembly of claim 6 wherein said plurality of possible operating modes comprises at least one operating mode selected from the group consisting of:

a first operating mode having a having a first parameter, wherein in said first mode said microprocessor strobes at least one of said first, second, and third pluralities of LEDs at a frequency that is a function of said first parameter;

a second operating mode having a second parameter, wherein in said second mode said microprocessor cause said LED assembly to display apparent rotation with an apparent rotation frequency that is a function of said second parameter;

a third operating mode having a third parameter, wherein in said third mode said microprocessor powers exactly one of said at least one plurality of LEDs based on said third parameter;

a fourth operating mode comprising a multiple-color cycle frequency parameter, wherein in said fourth mode said microprocessor cycles between at least two of said at least one plurality of LEDs with a frequency that is a function of said fourth parameter; and a fifth operating mode having a fifth parameter, wherein in said fifth operating mode said microprocessor selectively actuates said at least one plurality of LEDs based on the level and frequency of ambient sound.

8. A lighting assembly comprising:

a socket adaptor;

a cap fixed to said socket adaptor;

an LED assembly comprising a generally-tubular support and an LED array having at least one plurality of LEDs, said support having an open end attached to said cap and an opposing closed end;

an electronics housing positioned within said support and electrically connected to said socket adaptor;

a generally-tubular lens having an open end;

a processor-readable medium within said electronics housing;

a microprocessor for receiving user input and selectively actuating at least one LED based on said user input, said microprocessor enclosed within said electronics housing and electrically connected to said processor-readable medium;

and a local tactile input device electrically connected to said microprocessor.

9. The lighting assembly of claim 8 further comprising an audio input device electrically connected to said microprocessor.

10. The lighting assembly of claim 8 further comprising a remote input device in selective electromagnetic communication with said microprocessor.

11. The lighting assembly of claim 8 wherein said at least one LED comprises a first plurality of LEDs having a first color, a second plurality of LEDs having a second color, a third plurality of LEDs having a third color, and a fourth plurality of LEDs having a fourth color.

12. The lighting assembly of claim 8 wherein said processor-readable medium includes computer-executable instructions for performing a method comprising:

selecting a current operating mode from a plurality of possible operating modes based on user input, wherein each of said possible operating modes includes at least one operating mode parameter;

changing an operating parameter for the current operating mode based on user input; and providing output from said microprocessor to said LED assembly, wherein said output is a function of said current operating mode and said current operating mode parameters.

13. The lighting assembly of claim 12 wherein said plurality of possible operating modes comprises at least one of mode selected from the group of modes comprising:

a first operating mode having a first parameter, wherein in said first mode said microprocessor strobes at least one of said first, second, and third pluralities of LEDs at a frequency that is a function of said first parameter;

a second operating mode having a second parameter, wherein in said second mode said microprocessor causes said LED assembly to display apparent rotation with an apparent rotation frequency that is a function of said second parameter;

a third operating mode having a third parameter, wherein in said third mode said microprocessor powers exactly one of said at least one plurality of LEDs based on said third parameter;

a fourth operating mode comprising a multiple-color cycle frequency parameter, wherein in said fourth mode said microprocessor cycles between at least two of said at least one plurality of LEDs with a frequency that is a function of said fourth parameter; and a fifth operating mode having a fifth parameter, wherein in said fifth operating mode said microprocessor selectively actuates said at least one plurality of LEDs based on the level and frequency of ambient sound.

14. The lighting assembly of claim 8 further comprising a remote input device in selective electromagnetic communication with said microprocessor.

15. The lighting assembly of claim 1 wherein said lens tapers to a closed end.

\* \* \* \* \*